July 3, 1956 S. F. KAPFF ET AL 2,752,776
APPARATUS FOR DETERMINING FLASH POINT
Filed April 30, 1954 5 Sheets-Sheet 2

INVENTORS:
Sixt Frederick Kapff
Robert B. Jacobs
BY
Everett A. Johnson
ATTORNEY

July 3, 1956  S. F. KAPFF ET AL  2,752,776
APPARATUS FOR DETERMINING FLASH POINT
Filed April 30, 1954  5 Sheets-Sheet 4

INVENTORS:
Sixt Frederick Kapff
BY  Robert B. Jacobs
Everett O. Johnson
ATTORNEY United States Patent Office 2,752,776
Patented July 3, 1956

2,752,776

APPARATUS FOR DETERMINING FLASH POINT

Sixt Frederick Kapff and Robert B. Jacobs, Homewood, Ill., assignors to Standard Oil Company, Chicago, Ill., a corporation of Indiana Application April 30, 1954, Serial No. 426,816

5 Claims. (Cl. 73—36)

This invention relates to the determination of the flash point of hydrocarbon liquids and more specifically relates to apparatus for such determination.

The American standard methods for the determination of flash points include the Tag Closed Cup, Pensky-Martens Closed Cup, and the Cleveland Open Cup. In each of these methods the oil sample is heated at a pre-scribed rate and a test flame of precise size is inserted periodically into the vapor above the sample. The oil temperature at which the vapor explodes is designated as the "flash point." Of the three standard flash point tests, the Pensky-Martens is the most rapid, but it sacrifices some accuracy, and in certain applications the slower Tag Closed Cup is specified. Even the fastest flash point test requires at least approximately ten minutes per sample and when maximum accuracy is desired approximately twenty minutes are needed. In view of the long time necessary and the great care required for the individual samples under the conventional methods for the determination of flash point, it is not convenient to handle a large number of samples on an assembly line basis.

In a large petroleum laboratory, six to seven thousand flash point tests per month are not unusual, and it is apparent that there is a great expenditure of skilled manpower when the test must be run individually and requires 20 to 25 minutes to complete. Heretofore, no satisfactory system has been devised for the mass testing. However, commercially available devices have been introduced which proposed to detect the presence of low flash contaminants in oils of higher flash point by bubbling air through the sample and then into a combustible gas indicator, but such systems cannot be used effectively to measure flash points. In such systems, the requisite control of sensitivity and zero readings is unattainable and the vapor in the air stream reaching the instrument is not necessarily in equilibrium with the liquid under test. Accordnigly, this type of device has not been found acceptable for flash point determination.

It is, therefore, an object of this invention to provide an apparatus which is particularly adapted for use in analyzing a multiplicity of samples. Another object of the invention is to provide a novel flash point indication system which has an accuracy which is comparable to the best of the standard methods. Still another object is to provide such a system which requires a substantially shorter period of time for test than the most rapid standard methods. A more specific object of the invention is to provide an electrical system for automatically determining and recording an indication of the flash point. A further object is to provide a reliable flash point instrument which can be operated with a minimum of attention. Another object is to provide a filament assembly which maintains its uniform characteristics. These and other objects of the invention will become apparent as the description thereof proceeds.

A system has been devised for automatically obtaining an indication of the flash point of liquids by means of an apparatus comprising a Wheatstone bridge, in adjacent legs of which are placed two identical catalytic oxidizing surfaces in the form of portable filaments. One filament is exposed to the oil vapors and the other is not. The bridge current normally heats both filaments equally but in the presence of oil vapors the catalytic oxidation of the oil vapors raises the temperature of the exposed filament and therefore its resistance. This results in a change in the ratio of the filament resistances and a voltage is developed across the bridge which is correlated with flash points. Such a system is described and claimed in a co-pending application Serial No. 192,516 filed October 27, 1950.

By such a system a large number of samples are tested at the same constant temperature, each individual sample being placed in a partially filled closed container or flask and immersed in a constant temperature bath. When the sample vapor has come to equilibrium, the heated catalytic oxidizing surface in the form of the portable metal filament is inserted into the vapor space of the sample container and combustion occurs at the test filament causing the rise in temperature. To eliminate extraneous temperature effects, a second "reference" filament, not exposed to combustible vapors, is connected in the adjacent arm of the Wheatstone bridge.

The rise in the test filament's temperature depends upon the rate of combustion and the resulting unbalance of the Wheatstone bridge is correlated with the flash point of the sample. The equilibrium temperature assumed by the metal filament in air containing combustible vapors of the test sample depends upon the rate at which heat of combustion is supplied to the filament. This rate in turn depends upon the vapor pressure and heat of combustion per mol of vapor. Most petroleum fractions and petroleum products have approximately the same available heat of combustion per unit volume at the flash point, i. e., the explosive limit of the vapor. The vapor pressure of each of these fractions changes proportionally in going from its flash point temperature to the bath temperature, and the available heat of combustion per unit volume of vapor for each sample at the bath temperature is inversely proportional to the temperature differential between the bath temperature and the flash point temperature. Accordingly, by measuring the available heat of combustion at bath temperature, an indication is obtained of the temperature at which the available heat is sufficient to support a flash. When the temperature differential is not more than about 70° F., filament temperature can be correlated with flash point of a known standard.

The successful determination of flash points by this type of system depends to a great extent upon the uniformity of the comparative filaments. However, when the temperature of the filament increases during the catalytic oxidation thereon, the filament changes in length and shape and therefore changes its thermal radiation characteristics and hence changes the measured filament temperature.

To avoid these difficulties, a spring-loaded straight platinum filament has been devised which has been described and claimed in a copending application Serial No. 192,515 filed October 27, 1950. The portable filament is supported in tension between a pair of spaced mounting springs fixed to a pair of parallel conductor posts embedded in a generally cylindrical insulating body encased within a brass sleeve. The filament assembly or probe is adapted to be inserted within a test flask, thereby placing the filament within the vapor space of the flask in a zone which is at equilibrium with regard to temperature and vapor concentration. The filament is in a horizontal or transverse position with respect to the longitudinal axis of the probe and this places the filament near the surface of the liquid sample in the flask. This is essential to avoid vapor pressure and temperature gradients which might occur between the surface of the liquid and the neck of the flask.

In systems of this type, it is important that the level of the test fluid in the sample container be maintained uniform and constant during the filling and heating up steps. It is important that the filament be maintained a predesignated distance from the vaporizing surface of the liquid sample. Likewise, it is important that the sample containers be filled rapidly, be self-rinsing, and be drained rapidly. In using the laboratory flash point device described in application Serial No. 192,516, a certain amount of inconvenience arises in the cleaning of the sample containers. This operation involves removing a rack of five containers from an oil bath, washing them out with solvents, blowing out the solvents, returning the rack to the oil bath, and refilling the containers. Accordingly, an important object of this invention is to eliminate this series of operations. An additional object is to provide a sample container array which is compact and convenient. An additional object of our invention is to provide a sample container in which the level of liquid sample can be obtained quickly and with a minimum of attention. A further object is to provide a sample container whereby upon the completion of the test the sample can be removed and the container rinsed without disturbing the sample cell in the apparatus. These and other objects of our invention will become apparent as the description thereof proceeds.

Briefly, according to our invention, we have provided a plurality of large funnels located along the front edge of a temperature bath. The liquid drains into the sample cups from the funnels and fills the cups above a standpipe extending through the bottom thereof. This provides a predetermined level of liquid since the liquid partially drains therefrom by a siphon action to a preselected level. The sample containers are then corked and allowed to reach bath temperature after which the samples are tested as described herein. When the six samples have been tested, a common drain is opened and all the sample cups are emptied simultaneously. After drainage has been completed, the common drain is closed and the six cups are ready to receive six more samples. However, if desired, we may rinse the sample cups by pouring a quantity of solvent through the funnels into the sample cups, which solvent is then siphoned from the sample cups by displacing the solvent with liquid to be tested.

Further details of the invention will be described by reference to the accompanying drawings, wherein.

Figure 4:
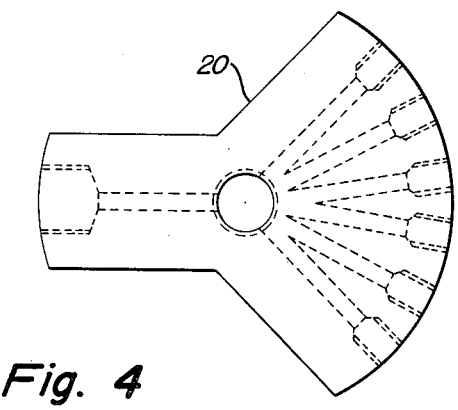
Figure 4 is a detail viewed along the line 4—4 in Figure 1.

Referring to the drawings, the bath 10 is preferably cylindrical and provided with a flat cover plate 11. A plurality of sample containers 12 are arranged symmetrically about the bath 10 and are supported with their upper throats 13 protruding through the plate 11. The funnels 14 are arrayed in juxtaposition and feed by individual lines into the base of the individual containers 12. The lines 15—16 serve both to fill and to drain the sample containers 12 via the dump valve 17. The lines 16 are connected by manifold 18 to this valve 17 which is operated as described below. The siphon lines 19 are connected to a fan-shaped manifold 20 (note Figure 4) and the drain 21.

Figure 1:
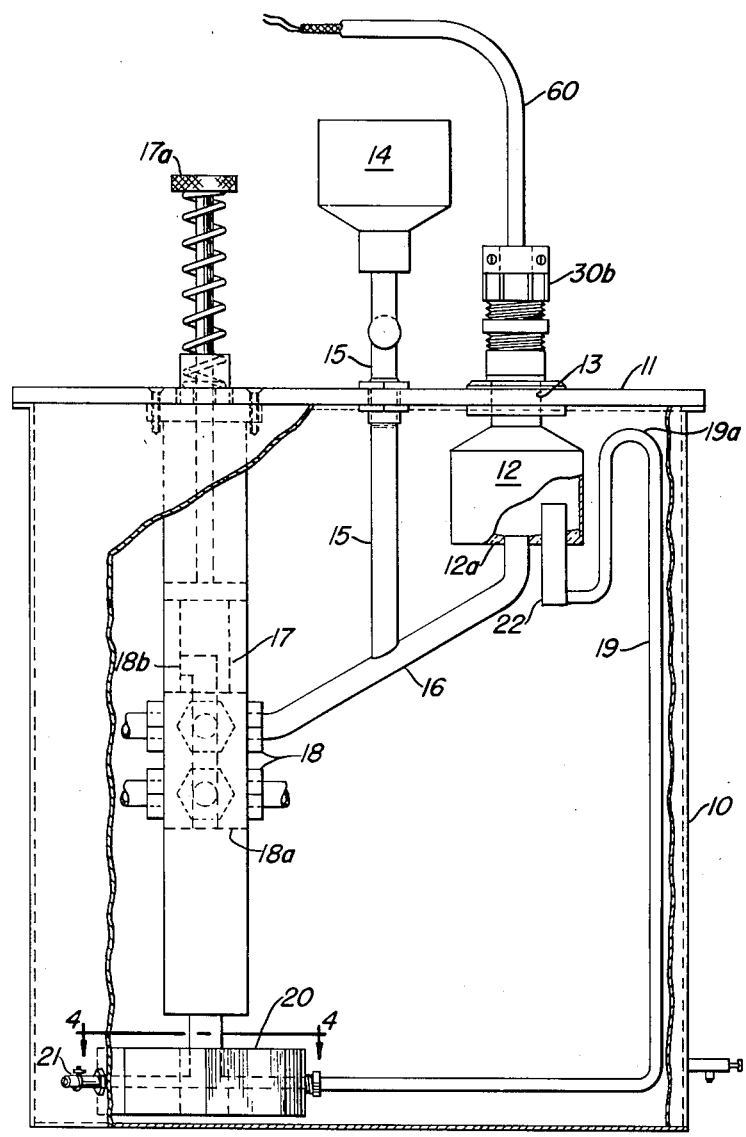
Figure 1 is an elevation, partly in section, showing details of our improved sample container.
Figure 2:
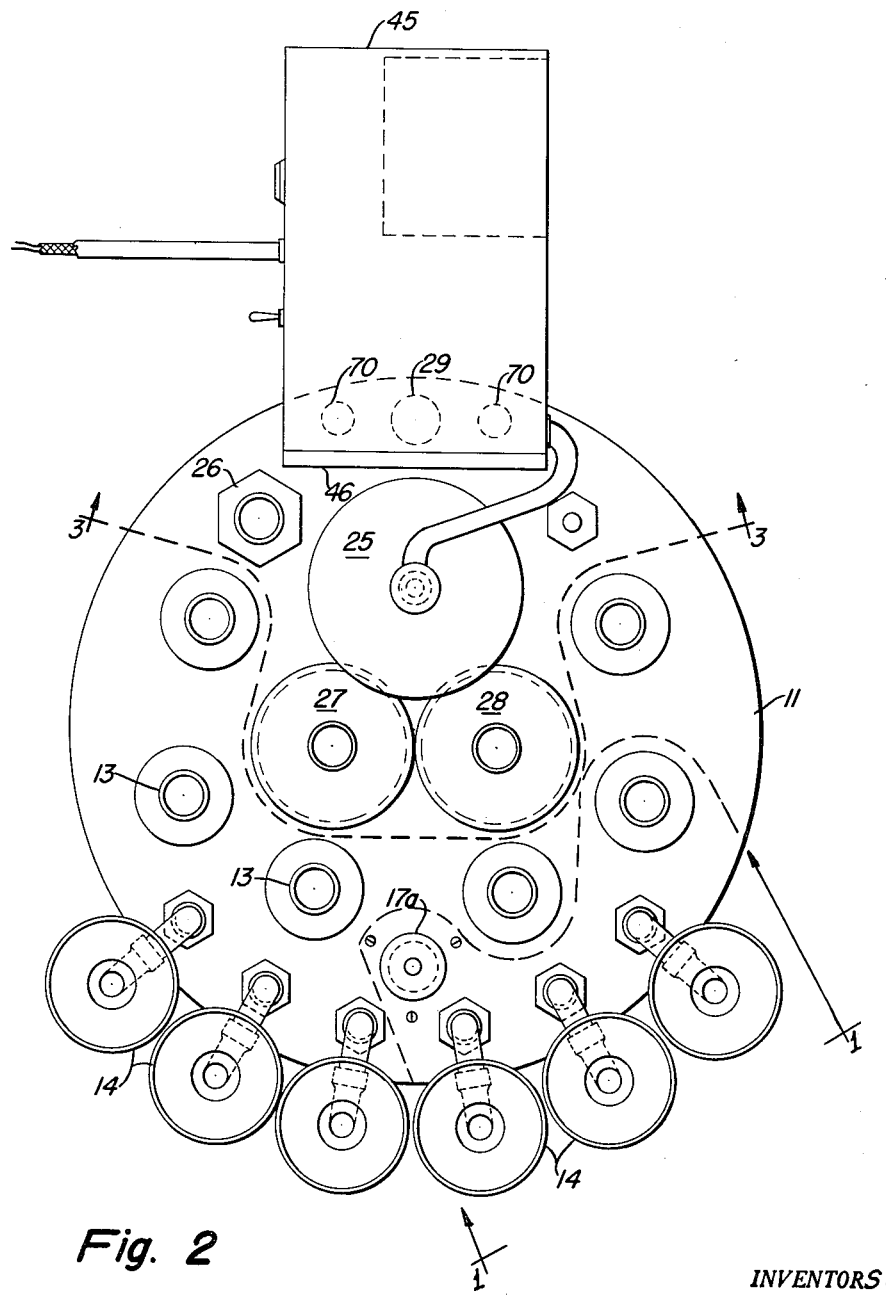
Figure 2 is a top plan view illustrating the array of sample containers.
Figure 3:
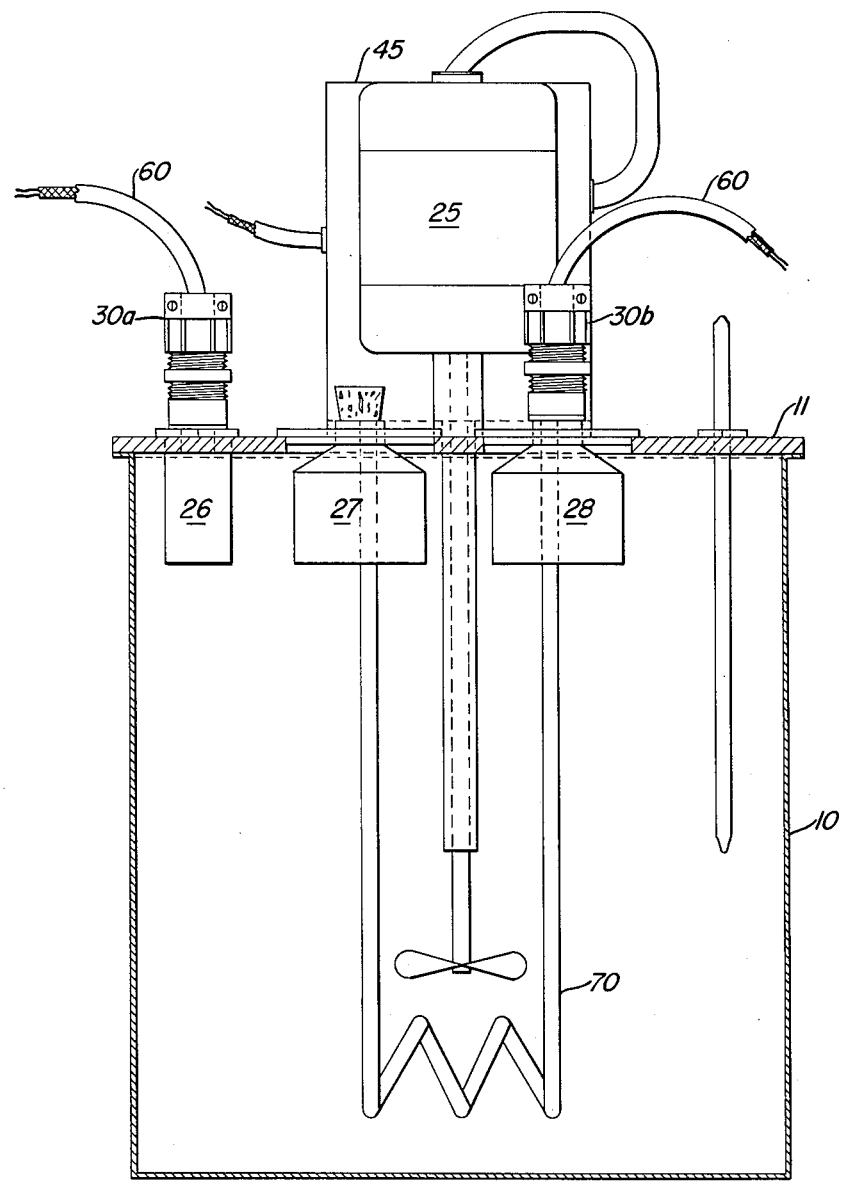
Figure 3 is a section taken along the line 3—3 in Figure 2.

Referring to Figures 1 and 2, the sample to be tested is poured into the funnel 14 having a standpipe 15 communicating with cup 12 by line 16 in a sufficient amount to fill the sample cup 12 to the level of the top of the outlet tube 19a. When this level is reached, the cup 12 begins to empty by siphoning of the sample by depending line 19 having inverted U-bend 19a. This continues until the level of the standpipe outlet 22 is reached at which time siphoning ceases and the sample is now ready for testing as described below.

To empty the sample cup 12, the dump valve 17 is opened by depressing rod 17a to lower the plug 18a and bring channel 18b into communication with manifold 18 and the sample flows via line 15 extending from the base 12a of cup 12 and the complete sample is withdrawn. The base 12a is sloped downwardly and inwardly as illustrated so as to facilitate the complete drainage of the sample from cup 12.

The bath temperature determines the useful flash point range of the instrument and, in general, this range is limited to about 75° F. above the bath temperature since beyond such upper limit sensitivity diminishes rapidly. The maximum temperature variations between any two points in the bath at any time is kept less than 0.4° F. by vigorous circulation of the bath liquid and a stirrer 25 may be provided for that purpose. Within the bath 10 at all times is supported a reference container 26, a zero container 27 and a check container 28 to be described in greater detail below.

The bath 10 is provided with a cover or dome 11 which supports the six sample containers 12 and the reference, zero and check containers 26, 27 and 28. The thermostatic control 29 for the bath 10 is mounted through the dome 11.

Figure 6:
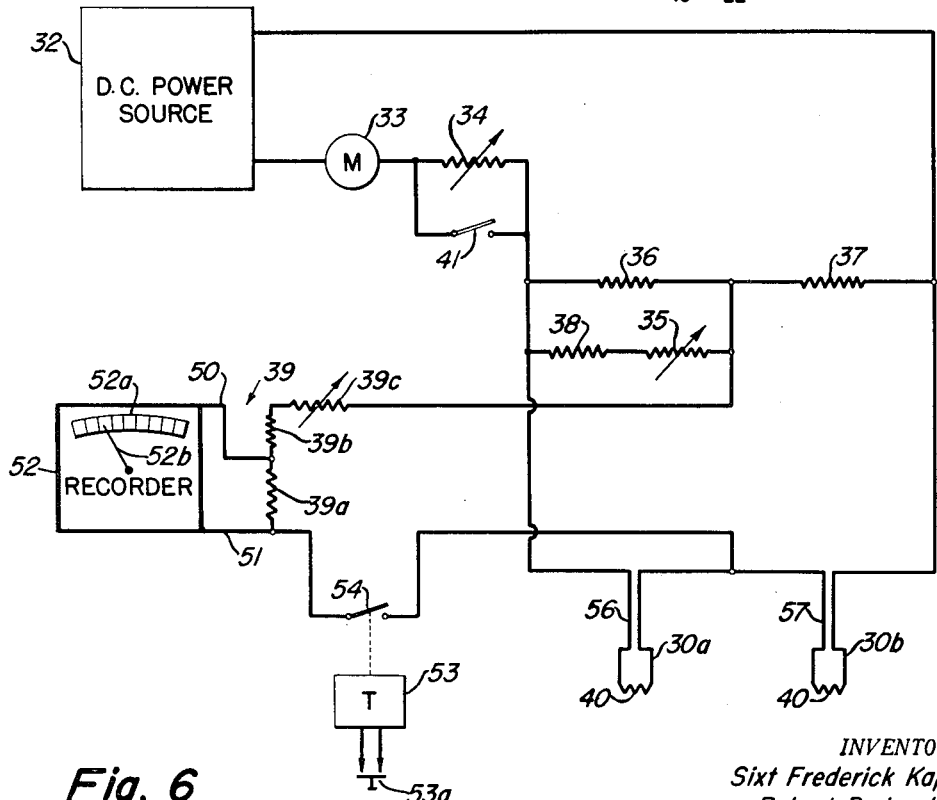
Figure 6 is a diagrammatic showing of the electrical elements of the measuring and indicating circuit.

A pair of probes 30a and 30b are connected in the electrical test circuit as illustrated by Figure 6. A direct current power source 32, which may comprise a transformer and a rectifier or a battery, is applied to the bridge circuit containing ammeter 33; variable resistors 34 and 35; fixed resistors 36, 37 and 38; output voltage divider 39 comprised of resistors 39a, 39b and 39c; switch 41; filaments 40; and the associated conductors.

In a typical apparatus, the meter 33 reads from 0 to 1000 ma.; resistor 34 is variable from 0 to 3 ohms; resistor 35 is variable from 0 to 100 ohms; fixed resistors 37 and 38 have a value of 50 ohms each; and fixed resistor 36 a value of 100 ohms. The direct current source 32 supplied 1 amp. at 6.3 volts. For the output voltage divider 39, resistor 39a is fixed at 700 ohms, 39b is 200 ohms, and 39c is variable from 0 to 500 ohms. The casing 45 contains the thermostatic control means with its associated components including the heaters 70, and a thermostat 29. The circuitry represented by Figure 6 is ordinarily housed in a separate box (not shown) and may be mounted on the recorder 52.

The output of the bridge circuit is transmitted by leads 50 and 51, across which is the output voltage divider 39, to an indicator or recorder means 52. A cycle timer 53, initiated by a push button 53a, controls the input to the recorder circuit through switch 54 so that the heating-up time is not recorded. By adjustment of the output voltage divider 39 and by using a voltmeter-type indicator 52 having a scale 52a calibrated in flash points, we indicate flash point values directly which may be recorded on a chart.

Figure 5:
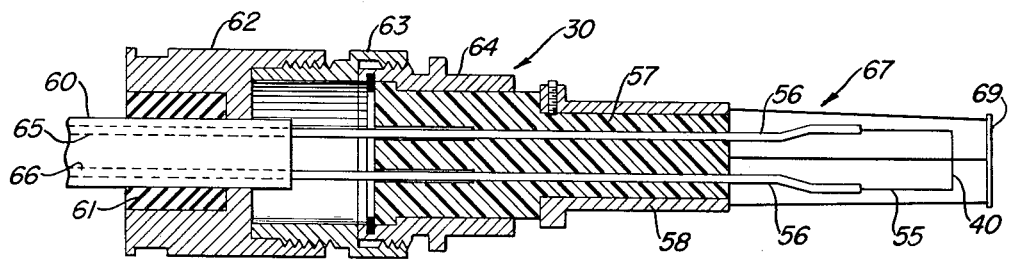
Figure 5 is a longitudinal section of the probe used in our invention.

Referring to Figure 5, the details of our portable probes 30 are illustrated. The filaments 40 (corresponding to filaments 40 in Figure 6) are wires or rods which contain elements capable of catalyzing combustion of the hydrocarbon and a preferred filament is platinum wire which may be, for example, of about 0.003 inch diameter and about 0.266 inch in length mounted between stainless steel mounting springs 55 which may be about ⅜ inch in length and .004 by 1/32 inch in cross section. These mounting springs 55 are fastened to substantially parallel conducting posts 56 embedded in a generally cylindrical body portion 57 made of insulating material such as "Lucite." A brass flanged sleeve 58 surrounds the lower portion of the elongated body 57 and this sleeve 58 is adapted for snug fit in the neck 13 of the particular container 12.

A shielded electrical cable 60 passes through packing 61 anchored in nut 62 which is threaded to the cylindrical connector shield 63, which is in turn threaded to flanged sleeve 64, encircling a substantial proportion of the body 57. The conductors 65 and 66 are electrically connected to the posts 56 in circuit with springs 55 and filaments 40. A protective cage 67 having bars 68 extending longitudinally from the rim of brass sleeve 58 to a terminal ring 69 is provided to prevent damage to the mounting springs 55 and the filament 40.

Preliminary to making a flash point determination employing our sample container, the bath oil is placed in the bath 10 to the desired level and the temperature of the oil is brought to about 100° F. by conventional thermostatically controlled heating unit 70, the operation of which is controlled by the thermostatic means 29. The check container 28 contains about 20 cc. of pure n-decane. The zero container 27 contains about 20 cc. of loose, fresh activated charcoal. When the test probe 30a is in the check container 28 (containing the decane), the deflection of the indicator 52 is adjusted by means of the output voltage divider 39 to an indicated mark on scale 52a calibrated directly in terms of flash points. The reference probe 30b is kept permanently in empty reference container 26 within the bath 10 to maintain it as the ambient filament temperature.

In the illustrated circuit, we employ a push-button controlled cycle timer 53 and, typically, the voltage is repeatedly applied to the recorder 52 for only about the last half of the test period. This accentuates the indicated deflection of the pointer or pen 52b and eliminates the drawing of a record during the period in which the filament 40 is attaining equilibrium within a test flask 12. This gives an easily noted reading which is proportional to the relative temperature of the test filament 40 after it has attained equilibrium conditions.

Figure 7:
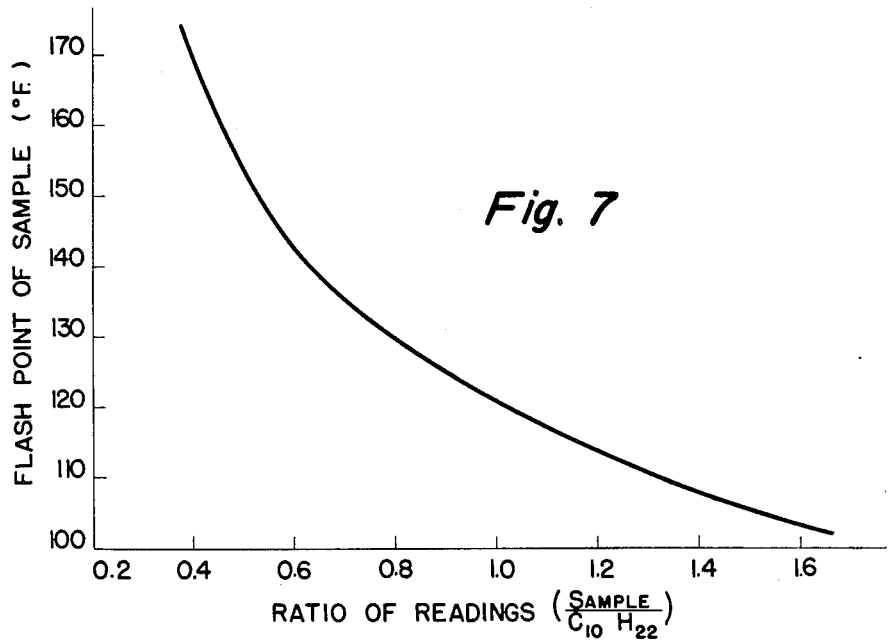
Figure 7 is a calibration curve correlating the ratio of readings with flash points of samples.

The bridge output for each sample bears a definite ratio to the corresponding bridge output for a standard such as decane and a calibration curve plotted on this basis is shown in Figure 7 for the flash point range of 100 to 175° F. A large number of tests were made with the catalytic filament on samples of know flash points and the ratios of the recorder readings of the sample and of the standard were plotted to provide the curve of Figure 7. The flash points of other blended samples were determined by precision Tag Closed Cup tests and these check points fell on a smooth curve well within the points obtained earlier. Thus, when the ratio of the sample reading to the check reading obtained with pure decane is applied to the curve, the flash point can be read off directly.

To calibrate the device, the test probe 30a is placed in the zero container 27 and the bridge current, as indicated by meter 33, is adjusted by means of variable resistance 34 to a prescribed value. This is the heating current required to make the platinum filaments 40 catalytic. Thus, with a current of about 0.75 amp. the filament is brought to about 850° F. and temperatures between about 700° F. and about 1000° F. can be used. With the test probe 30a still in the zero container 27, the bridge is then balanced by means of variable resistance 35, as indicated by the recorder 52 when timer 53 is operated. The test probe 30a is then removed from the zero container 27 and immediately placed in the check container 28 containing the pure decane. The timer 53 is operated and the deflection on scale 52a is noted and variable resistor 39c is manipulated to bring the deflection to the calibrated mark. The zero should then be checked and corrected by means of variable resistor 39c. Repeated adjustment of the sensitivity and zero controls may be necessary. When these have been made the sensitivity of the instrument has been adjusted so that the calibrated scale 52a applies. However, if the deflection cannot be brought up to the calibrated mark, the sensitivity can be increased by removing the test probe 30a and, while holding it in air, passing a greater current therethrough by closing the conditioning switch 41. With the filament 40 sufficiently sensitive, the output voltage divider 39 is adjusted to bring the deflection obtained with decane (or other standard) up to the calibrated mark on the scale 52a.

To perform a test, the sample containers 12 are rinsed with solvent and filled to the desired level with the liquids under test. The sample containers are corked by stopper 12c and the samples brought to the oil bath temperature.

The test probe 30a is placed in the first sample containers 12 and the deflection of the recorder 52 observed and recorded. Between samples, the test probe 30a is blown dry in a heated air stream. The six samples can be tested in rapid succession, but after each six samples it may be necessary to make another sensitivity test in the check container 28 and the variable resistor 39c should be changed accordingly. If the deflection on the calibrated scale 52a now deviates more than ±5.0° from the calibrated mark for the check liquid, then the "zero" reading with the probe in container 27 should be checked and, if necessary, corrected by adjusting the variable resistance 35.

Lower or higher bath temperatures may be used to cover different ranges of flash points. For example, the device may be operated at considerably elevated temperatures to cover flash points as high as motor oils and the like. The useful instrument range of flash points is from about 10° F. above temperature to about 70° F. above such temperature. If a high bath temperature is used, provision may be made for heating the probes while out of the sample containers so as to avoid condensation of sample vapors on the probe upon insertion in the sample container. This may be accomplished, for example, by providing a second air-sealed flask corresponding to the reference cell 28.

Likewise, we may cover several ranges of flash points by the selection of appropriate thermostats and selector switches to permit bath operation at any desired bath temperature. Similarly, the temperature bath may be replaced by a thermostated metal block, or the like, which has the advantages of eliminating the oil bath and the stirring mechanism. Such block may be divided, with the flask, fill pipes and siphon drains comprising recesses in the block. The unit, of course, need not involve six sample cups but any number may be used and, in the event of the thermostated block embodiment, it might be desirable to have only a single sample cup.

Although our invention has been described in terms of specific apparatus which is set forth in considerable detail, it should be understood that this is by way of illustration only and that the invention is not necessarily limited thereto, since alternative embodiments and operating techniques will become apparent to those skilled in the art in view of our disclosure. For example, the device can be modified to operate in a continuous manner whereby a measurement is made by comparison of the filament readings in the vapors of a standard liquid and of a test liquid. Accordingly, modifications in the invention are contemplated without departing from the spirit of the described invention or the scope of the appended claims.

What we claim is:

1. An apparatus for determining the flash point of hydrocarbon liquids by measuring the rate of oxidation of the vapors thereof, comprising in combination a constant temperature bath and a stoppered sample flask in said bath, funnel means mounted exterior of said bath, a conduit leading from said funnel means into the bottom of said flask, an overflow means within said flask, a siphon means within said bath connected to said overflow means, said siphon means having an inverted U-turn portion at a level above said overflow means, manifold means within said bath and into which said siphon means discharges, and a valve means exterior of said bath controlling the flow from said manifold.

2. In an apparatus for determining the flash point of hydrocarbon liquids by measuring the rate of oxidation of the vapors thereof and including in combination a plurality of sample flasks within a constant temperature bath, the improvement which comprises a temperature bath means, a flask means, a dome on said bath, means for supporting said flask means from said dome, a funnel means extending through said dome and in communication with said flask means, an overflow outlet means extending from a point in said flask above said base, a siphon means connected to said overflow outlet means, and a drain means connected to a plurality of overflow siphon lines from a plurality of flasks and discharging exterior of said bath means.

3. In an apparatus for determining the flash point of hydrocarbon liquids by measuring the rate of oxidation of the vapors thereof, the improvement comprising in combination a constant temperature bath, a stoppered sample flask in said bath, said flask comprising a bottom liquid reservoir section and an upper vapor trap section, an electrically heated catalytic filament means extending within said flask and into said vapor trap section, an inlet and an outlet through the base of said flask, said inlet terminating flush with the bottom of said flask, a funnel means mounted on said bath and having a conduit discharging into said inlet means, said outlet means comprising an upstanding overflow pipe passing through the base of said flask and having an upper edge substantially above said inlet, a siphon means into which said outlet discharges, and dump valve means connected to said funnel means and to said siphon means and discharging exterior of said bath, whereby the entire contents of the funnel, flask, and siphon means may be discharged rapidly.

4. An apparatus for determining the flash point of hydrocarbon liquids by measuring the rate of oxidation of the vapors thereof at a uniform temperature comprising in combination a constant temperature bath, a plurality of sample flasks within said bath, each of said flasks including a lower reservoir portion and an upper constricted throat portion by which the flask is supported in the bath, funnel means mounted on said bath for filling said flasks, said means including a first conduit means leading from the funnel in each said funnel means into the bottom of one of said flasks, means for controlling the level of liquid within each said flask including an overflow pipe extending within each flask above the bottom thereof to a height corresponding to the desired liquid level, a siphon means connected to said overflow pipe exterior of said flask, said siphon means having an inverted U-bend portion extending above the upper edge of said overflow pipe and below said constricted throat portion, drain conduit means connected to each of said first conduit means, manifold dump valve means into which said drain means discharge, said dump means discharging into said second manifold means, a second manifold means into which each of said siphon means discharge, and a common drain conduit into which said dump valve and said second manifold means discharge, said drain conduit having its outlet exterior of said bath.

5. In an apparatus for filling and draining a sample flask while submerged within a constant temperature bath the improvement which comprises a sample flask, a first port means in the bottom of such flask, a second port means in the bottom of said flask, a funnel means mounted on the exterior of said constant temperature bath, a manifolded valve means within said temperature bath below said flask and controllable exterior thereof, said valve means including an outlet means exterior of said bath, a first conduit means extending downwardly between said first port means and said manifolded valve means, a standpipe depending from said funnel means and discharging into said first conduit means, an overflow pipe extending through said second port means, and a siphon tube having an inverted U-bend connected between said overflow pipe and said outlet means whereby liquid introduced through said funnel means automatically fills said flask to a level corresponding to the upper edge of said overflow pipe.

References Cited in the file of this patent

UNITED STATES PATENTS

| | | |
|---|---|---|
| 2,002,101 | Valby et al. | May 21, 1935 |
| 2,082,299 | Nonhebel et al. | June 1, 1937 |
| 2,655,893 | Cox et al. | Oct. 20, 1953 |

FOREIGN PATENTS

| | | |
|---|---|---|
| 7,508 | Germany | Oct. 2, 1879 |